United States Patent

Vesey et al.

Patent Number: 5,551,708
Date of Patent: Sep. 3, 1996

[54] FACE RING RETAINER ARRANGEMENT FOR MECHANICAL SEAL

[75] Inventors: John R. Vesey, Mattawan; Harry L. Mason, Portage, both of Mich.

[73] Assignee: Durametallic Corporation, Kalamazoo, Mich.

[21] Appl. No.: 268,235

[22] Filed: Jun. 29, 1994

[51] Int. Cl.$^6$ .................................................. F16J 15/38
[52] U.S. Cl. .......................................... 277/81 R; 277/85
[58] Field of Search .............................. 277/38, 39, 81 R, 277/85, 87, 115, 26, 170

[56] References Cited

U.S. PATENT DOCUMENTS

| | | | |
|---|---|---|---|
| 3,765,689 | 10/1973 | Adams | 277/26 |
| 4,261,581 | 4/1981 | Hershey | 277/26 |
| 4,364,571 | 12/1982 | Hershey | 277/87 |
| 4,700,953 | 10/1987 | Kuusela et al. | 277/81 R |
| 4,773,655 | 9/1988 | Lummila et al. | 277/81 R |
| 4,971,337 | 11/1990 | Hufford . | |
| 5,039,113 | 8/1991 | Gardner | 277/81 R |
| 5,042,824 | 8/1991 | Gardner et al. . | |

FOREIGN PATENT DOCUMENTS 2301082  8/1973  Germany .................................. 277/85

*Primary Examiner*—William A. Cuchlinski, Jr.
*Assistant Examiner*—Scott W. Cummings
*Attorney, Agent, or Firm*—Flynn, Thiel, Boutell & Tanis, P.C.

[57] ABSTRACT

A mechanical seal assembly having a face ring disposed within an axially-opening recess associated with a support ring. The support ring includes a sleevelike shroud which externally surrounds and maintains the face ring in concentric relationship. A separate retainer ring cooperates between the shroud and face ring to axially and positionally secure the face ring to the support ring. The retainer ring includes an annular ring part which projects radially inwardly so as to radially overlap a part of the exposed face of the face ring to effect axial securement thereof to the support ring. The retainer ring in addition has an axially-extending sleeve part which projects axially and in surrounding relationship to the shroud. This sleeve part has a press-fit engagement with the shroud to create a fixed engagement of the retainer ring to the support ring.

7 Claims, 1 Drawing Sheet

FACE RING RETAINER ARRANGEMENT FOR MECHANICAL SEAL

FIELD OF THE INVENTION

This invention relates to a mechanical seal assembly, and specifically to such assembly having an improved face ring retainer arrangement.

BACKGROUND OF THE INVENTION

Mechanical seals, often times referred to as face seals, are commonly utilized on pumps and the like to provide a seal between a fluid handling device and the surrounding environment. In such mechanical seals, there is typically provided an opposed pair of face rings which have annular faces which are disposed in opposed association, with one ring typically being nonrotatably secured relative to a shaft, and the other nonrotatably secured relative to a surrounding housing. The face rings are urged axially toward one another and may have the opposed faces in relatively rotatable sliding contact with one another, or in some use situations may be separated by a fluid film, such as a gas seal. The face rings are themselves individually retained by surrounding support structures which may be associated with or comprise a part of the housing or shaft. In many instances the face rings are constructed of hard but brittle materials such as tungsten carbide, silicon carbide or other suitable materials which are well known for this utilization. Because of the hard but brittle characteristics of these materials, coupled with the operational requirements of the overall seal assembly, various structures have in the past been utilized for positionally securing the respective face rings.

In one conventional and well known structure, the face ring is positioned within an axially-opening recess formed in a support member which has a shroud-like sleeve which projects axially around the outer periphery of the face ring. A snap ring is releasably engaged within the mouth of the shroud in overlapping relationship with the face ring to axially secure the face ring to the support member. While this arrangement has been utilized in mechanical seals for many years, and does operate satisfactorily in many use situations, nevertheless the overall arrangement does possess undesirable features inasmuch as the utilization of the snap ring does require forming of an internal groove within the shroud, which groove in turn must be accurately formed and positioned so as to provide the overall but rather precise tolerances required with respect to positioning of the face ring on and within the shroud. Further, with this type of securing arrangement, in situations where the seal is subjected to pressure reversals (i.e., the system pressure is applied to the back side of the face ring), the snap ring is normally incapable of guaranteeing proper face ring compression, such as against a secondary seal, and thereby sealability and hence failure can occur. This mounting arrangement is unsuitable for situations where such pressure reversals may occur.

In a further known face ring retainer arrangement, the face ring is itself press fit within the shroud of the support member. This arrangement, however, can cause undesirable internal stresses and distortion of the face ring.

In another known face ring retainer arrangement, particularly in an attempt to overcome the problems associated with pressure reversals on the face ring as discussed above, the shroud has been provided with a separate retainer ring which is welded to the front edge of the shroud in overlapping and hence securing relationship to the face ring. While this arrangement is readily capable of withstanding a pressure reversal situation, nevertheless the overall manufacturing of this arrangement is both costly and complex. Further, this requirement of welding between the shroud and retainer ring, in the vicinity of the face ring when the latter is assembled within the shroud, can result in undesired thermal stresses and distortions.

Of even greater significance with respect to the welded retainer structure of the type described above, is the inability to carry out a simple and inexpensive field or remote location repair or rebuilding of the seal assembly. Replacement of face rings is a repair which is commonly required, and with the welded assembly described above, such repair cannot be easily or economically carried out at the job site or at a typical remote repair location since such location normally does not possess the structure or equipment required for such repair. Replacement of a face ring employing this welded retainer structure typically requires that the assembly be shipped back to the factory for reworking.

A mechanical seal employing a welded retainer structure of the type described above is disclosed in greater detail in U.S. Pat. No. 4,971,337.

Accordingly, this invention relates to an improved face ring retainer arrangement which is believed to overcome many of the disadvantages associated with known arrangements as described above. This improved retainer arrangement is believed highly desirable since it will successfully withstand pressure reversals which may occur in usage, but which in addition will permit the overall seal assembly to be maintained or repaired at the job site or at least at a remote repair location using minimal equipment so as to permit replacement of a face ring, if necessary, without requiring that the seal assembly be returned to the manufacturing site.

More specifically, this improved retainer arrangement is capable of retaining the face ring within the face end of the support ring regardless of whether the seal assembly is pressurized from the inside or outside diameter; and at the same time the secondary seal (e.g. a gasket), which functions as a resilient mounting for the face ring, remains in compression to maintain sealing about the secondary seal.

In the improved seal assembly of this invention, the face ring is disposed within an axially-opening recess associated with a support ring, which support ring includes a sleevelike shroud which externally surrounds the face ring to maintain the face ring in the desired concentric relationship. A separate retainer ring is provided for cooperation between the shroud and face ring to axially and positionally secure the face ring to the support ring. The retainer ring includes an annular ring part which projects radially inwardly so as to radially overlap a part of the exposed face of the face ring to effect axial securement thereof to the support ring. The retainer ring in addition has an axially-extending sleeve part which projects axially and in surrounding relationship to the shroud. This sleeve part has a press-fit engagement with the shroud to create a fixed engagement of the retainer ring to the support ring. This press-fit engagement is capable of withstanding pressure reversals imposed against the rear of the face ring, but allows the retainer ring to be relatively easily removed if necessary without requiring complex tooling or the like so as to permit replacement of the face ring.

In the improved seal assembly, as aforesaid, a secondary seal such as a gasket is preferably resiliently and sealingly engaged between the face and support rings to impose a resilient axial compression force against the face ring.

Other objects and purposes of the invention will be apparent to persons familiar with structures of this general type upon reading the following specification and inspecting the accompanying drawings.

Figure 1:
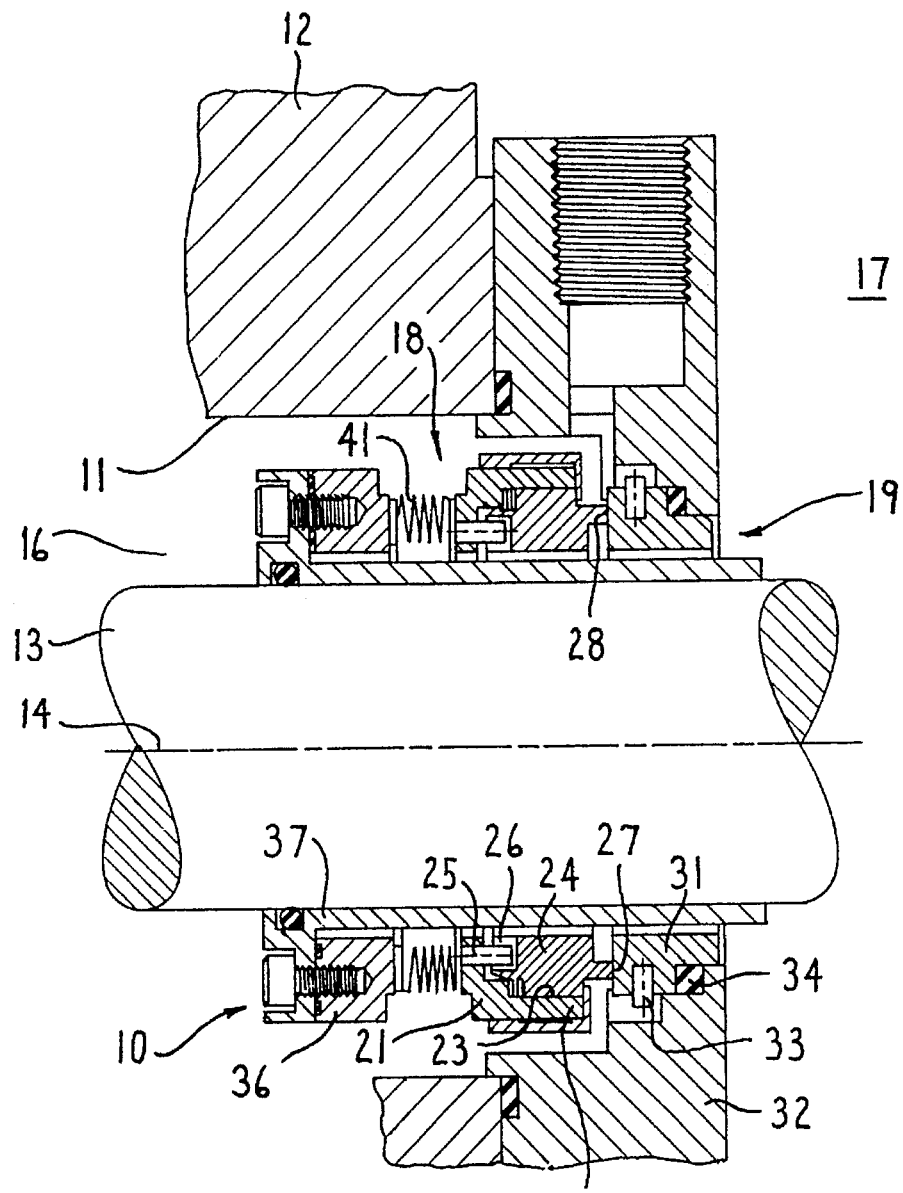
FIG. 1 is a central sectional view of a mechanical seal assembly which incorporates therein the improved face ring retainer arrangement of this invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure and designated parts thereof. Said terminology will include the words specifically mentioned, derivatives thereof, and words of similar import.

DETAILED DESCRIPTION

Referring to FIG. 1, there is illustrated a mechanical seal assembly 10 which is disposed within a stuffing box 11 as defined between a housing 12 and a shaft 13 projecting therefrom, the latter being rotatable about its axis 14. The seal assembly 10 cooperates between the shaft and housing to create a sealed relationship therebetween for preventing escape of fluid, such as from a pressure region 16 into the surrounding environment 17.

The seal assembly 10 includes a first seal ring assembly 18 which is nonrotatably secured relative to the shaft 13, and is conventionally referred to as the rotor assembly. This rotor assembly 18 in turn cooperates with a second seal ring assembly 19 which is disposed axially adjacent and in opposed relationship to the rotor assembly 18, and is nonrotatably secured relative to the housing 12.

Figure 2:
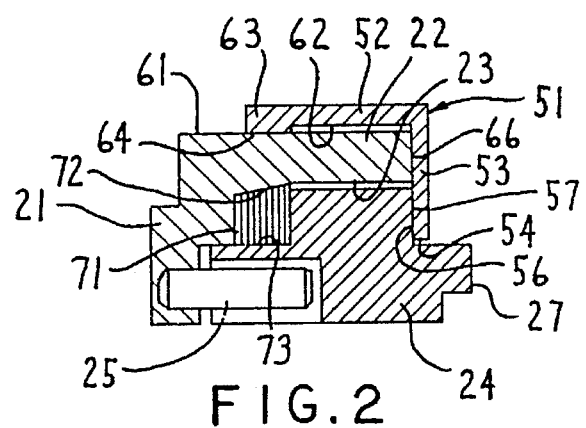
FIG. 2 is a fragmentary enlargement which relates solely to the improved face ring retaining arrangement of this invention and its cooperation between the face ring and its supporting member.

The rotor assembly 18 includes a ringlike support 21 which nonrotatably surrounds the shaft 13 and includes a cylindrical sleevelike shroud 22 which projects axially and defines therein an axially opening cylindrical recess 23 in which a face ring 24 is accommodated. The shroud 22 closely externally surrounds the outer annular periphery of the face ring 24, and in the present invention a small radial clearance normally exists therebetween as shown in FIG. 2. The face ring 24 is nonrotatably coupled to the support 21 by means of one or more pins 25 which are secured to the support 21 and project into notches or recesses 26 formed in the rear side of the face ring. This face ring 24 defines thereon a front annular seal face 27 which is maintained in opposed and relatively rotatable sealing relationship with a further annular seal face 28 as defined on the stationary ring assembly 19.

The stationary ring assembly 19 includes a further face ring 31 which generally surrounds the shaft in axially opposed relationship to the face ring 24, and which defines thereon the annular seal face 28. This face ring 31 in turn is nonrotatably supported on a gland ring or plate 32, the latter being suitably fixed to the housing in a conventional manner, such as by bolts or the like. The face ring 31 is nonrotatably secured to the gland, as by means of keys or pins 33, and a suitable gasket 34 is normally cooperatively disposed therebetween.

To nonrotatably couple the rotor assembly 18 to the shaft 13, there is provided an annular collar 36 which surrounds and is nonrotatably keyed to the shaft. In the illustrated embodiment there is additionally provided a shaft sleeve 37 which snugly surrounds and is nonrotatably secured to the shaft, which shaft sleeve 37 extends throughout the length of the seal assembly and has the collar 36 nonrotatably secured thereto. The collar 36 is disposed in axially spaced relationship to the rotor assembly 18 and is nonrotatably coupled thereto for rotatably driving the assembly 18. This drive coupling, as in conventional, may comprise drive pins (not shown) secured to the collar 36 and projecting axially therefrom into slots or recesses formed in the support ring 21 to nonrotatably couple these assemblies together.

Springs (not shown) also typically cooperate axially between the collar 36 and the support ring 21 so as to impose an axial urging force against the rotor assembly to urge it axially toward the opposed stator or ring assembly 19.

The seal assembly 10, in the illustrated embodiment, also includes an axially elongate sleevelike flexible bellows 41, typically a metal bellows, extending between and coupled to the collar 36 and the support ring 21 to assist in preventing the sealed fluid from gaining access to and escaping axially along the shaft.

The bellows 41, as is typical, is preferably constructed of a plurality of annular metal plates welded together as an integral structure, with opposite ends of the bellows being fixedly secured, as by welding, to the collar 36 and the support ring 21. The bellows is normally assembled in a somewhat compressed condition so as to effectively function as a spring and hence impose an axial resilient force against the rotor assembly 18 so as to urge the rotating seal ring 24 toward the opposed stationary seal ring 31. The bellows also nonrotatably couples the rotor assembly 18 to the collar 36 and hence to the shaft, although it will be appreciated that a further nonrotatable coupling, such as an axially extending pin-type coupling as described above, can be provided between the support ring 21 and collar 36 if desired or necessary.

The overall construction of the seal assembly 10, as described above, is conventional and well known, both in terms of its structure and general operation.

To provide for safe but replaceable securement of the rotating seal ring 24 within the support ring 21, the present invention provides a cuplike retainer 51 which structurally cooperates between the face ring 24 and the support ring 21. This enables the face ring 24 to be loosely or flexibly positioned within the recess 23 due to the clearance (as shown in FIG. 2) which surrounds the face ring. As shown in FIG. 2, the retainer 51 comprises a one-piece ring which includes an outer annular cylindrical sleeve part 52 which exteriorly surrounds the support ring shroud 22, which sleeve part 52 at one axial end terminates in a radially inwardly projecting annular flange part 53. The radial flange part 53 projects radially inwardly beyond the diameter of the recess 23 and terminates at a radially inner annular wall 54. The diameter of this inner annular wall 54 is significantly smaller than the diameter of the recess 23, whereby this radial flange part 53 has a rear annular surface portion 56 which is maintained in axial abutting contact with an opposed annular surface portion 57 defined on the front end of the rotating seal ring 24. The annular sealing nose or rib associated with the seal ring 24, which nose or rib defines the seal face 27 on the free end thereof, projects axially beyond the flange part 53, which flange part 53 is accommodated in a recessed corner or step defined at the outer circumference of the rotating seal ring 24, so as to permit the seal ring faces 27 and 28 to directly oppose and contact one another without encountering interference due to the presence of the flange part 53.

The annular sleeve part 52 of the retainer has an inner annular surface 64 which is snugly and frictionally engaged with the outer surface 61 of the shroud 22, this engagement preferably being a press fit. In the illustrated and preferred embodiment, the sleeve portion 52 is provided with an undercut groove or recess 62 which projects axially rearwardly from the radial flange part 53, with this undercut groove 62 having a diameter which slightly exceeds the diameter 61 so as to maintain a slight clearance therebetween. Sleeve part 52, however, adjacent the rear free end thereof, is free of this undercut groove 62 and in effect defines an annular rib portion 63 which projects radially inwardly a small extent beyond the undercut wall 62 so as to terminate in the inner annular wall 64. This wall 64, when the retainer ring 51 is in a free and disassembled condition, has a diameter which is slightly smaller than the diameter of the wall 61 of the shroud 22. However, when the retainer 51 is assembled onto the shroud 22, an interference or press fit is created between the walls 61 and 64 so as to securely and fixedly, but removably, hold the retainer 51 in engagement with the shroud 22. The degree of interference is defined as that amount required to maintain the press-fit with similar or dissimilar materials at up to the maximum temperature and/or pressure limit of the design.

With the retainer ring 51 assembled to the shroud 22 as illustrated in FIG. 2, which assembled position normally results in the radial flange part 53 of the retainer abutting the front face 66 of the shroud, the retainer wall 64 creates an annular engagement band where it is press-fit engaged with the shroud wall 61. This press-fit engagement band is generally disposed rearwardly a significant distance from the front face 66 so as to be positioned more closely adjacent the thickest cross section of the support ring 21 to minimize distortion thereof.

With the seal ring 24 axially retained within the support ring 21 by the retainer 51 as illustrated by FIG. 2, a secondary seal such as a gasket 71 is traditionally sealingly engaged both axially and radially between opposed walls on the ring 24 and support 21. The gasket 71 in the illustrated embodiment is confined within a steplike annular groove formed adjacent and around the rearward end of the seal ring 24. One of the radially opposed walls bounding the gasket is traditionally provided with a slight taper, particularly when the gasket is of a laminated graphite as sold under the trademark GRAFOIL, to improve the sealing properties of the gasket along the radially directed surfaces thereof in a manner which is conventional and well known. In the embodiment shown in FIG. 2, the outer boundary wall 72 is tapered while the inner boundary wall 73 is cylindrical. However, these can be reversed so as to provide the taper on the inner boundary wall if desired.

With the seal ring 24 confined within the support 21 by use of a retainer 51 as illustrated and described herein, the seal ring 24 is securely axially confined in opposite directions, and can readily stand pressure reversals without being dislodged. At the same time, this confinement of the sealing ring 24, particularly when the sealing ring is constructed of a brittle and/or hard material such as carbide, avoids having to form complex notches or grooves in the periphery thereof, and enables a secure engagement and retention by permitting engagement with a flat face of the sealing ring, thereby avoiding the creation of stress-creating notches and the like and also avoiding any radial interference-fit engagement between the seal ring 24 and support ring 21, and simplifying the overall construction of the sealing ring.

The cuplike retainer 51 and its press fit onto the shroud 22 also facilitates and simplifies the overall manufacture and assembly of the seal arrangement, and in addition permits the retainer 51 to be removed from the shroud so as to permit easy replacement of the seal ring 24 if necessary, which replacement can obviously be accomplished at the factory if desired, but can also be readily accomplished either at the job site or at a remote repair facility without requiring either complex repair skills or equipment.

Further, the overall assembly provides the desired securement of the face ring without inducing undesired physical distortions due to internal stresses, thermal expansion or the like such as would be caused by press or interference fit of the face ring within the support shroud.

The operation of the seal assembly 10 is conventional and well understood, whereby further description thereof is believed unnecessary.

While the invention as described above and as illustrated by FIGS. 1 and 2 disclose the cup-shaped retainer 51 being used for securing the rotating seal ring 24 to the rotor assembly, it will be appreciated that this same retaining structure can also be utilized for securing the stationary or nonrotatable seal ring to the stator assembly. In fact, this retaining structure can be utilized on either the stator or rotor assembly, or both, if desired.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A mechanical seal assembly for creating a sealed relationship between a housing and a rotatable shaft which is surrounded by the housing, comprising:

first and second seal ring arrangements disposed in axially opposed relationship to one another in surrounding relationship to the shaft, said first seal ring arrangement being nonrotatably coupled relative to the shaft and said second seal ring arrangement being nonrotatably coupled relative to the housing, said first and second seal ring arrangements being relatively axially movable, and resilient means for normally axially urging the seal ring arrangements relatively axially toward one another;

said first and second seal ring arrangements respectively including first and second annular seal rings which respectively define thereon first and second annular seal faces which are disposed in axially opposed and facing relationship and are normally maintained in relatively rotatable and slidable engagement with one another to create a seal between regions disposed adjacent radially inner and outer edges of said seal faces;

one said seal ring arrangement including a support ring maintained in axial and radial supporting engagement with one said seal ring as respectively associated with said one seal ring arrangement;

said one seal ring having first and second annular radial surfaces which face axially outwardly in opposite directions and which are respectively defined adjacent opposite axial ends of said one seal ring, said first radial surface facing axially in the same direction as the seal face defined on said one seal ring but being disposed axially inwardly from the respective seal face;

said support ring including a radial wall which is positioned in radially overlapping relation to said one seal ring adjacent a rear axial end thereof, said radial wall having a third radial surface thereon disposed in facing and opposed relation to said second radial surface, said support ring having an annular sleevelike flange which externally surrounds said one seal ring so as to be disposed in close proximity to an exterior cylindrical peripheral surface of said one seal ring without creating a distortion-inducing contact therewith, said annular flange terminating in a free end which is positioned in the vicinity of said first radial surface;

a one-piece cuplike retainer fixedly secured to said annular flange and radially overlapping said one seal ring for axially confining said one seal ring between said retainer and said radial wall, said retainer including an annular sleeve portion which is telescoped over said annular flange and is fixedly engaged therewith by a press fit therebetween, said retainer including a radial ringlike flange portion which is fixedly joined to and projects radially inwardly from said sleeve portion so as to radially overlap said one seal ring, said radial flange portion defining thereon a fourth radial surface which is disposed in opposed relation to said first radial surface;

said first and fourth opposed radial surfaces defining a first pair of confining surfaces which are disposed adjacent one axial end of said one seal ring and are disposed in direct axial abutting and contacting engagement with one another, and said second and third opposed radial surfaces defining a second pair of confining surfaces as disposed adjacent the other axial end of said one seal ring; and an annular gasket resiliently axially compressed between the opposed confining surfaces of said second pair of confining surfaces, said gasket being disposed radially between and radially sealingly engaged with said one seal ring and said support ring;

whereby said one seal ring is surrounded by and contained within the support ring and is axially confined between said third and fourth radial surfaces so as to withstand pressure reversals imposed on said one seal ring without requiring use of a radial interference-type fit between said one seal ring and said support ring.

2. A mechanical seal according to claim 1, wherein one of said support ring and said one seal ring has a tapered annular surface thereon in sealing engagement with said gasket.

3. A mechanical seal according to claim 1, wherein said radial flange portion of said retainer is fixedly secured to said annular sleeve portion adjacent one axial end thereof, and wherein said annular sleeve portion has an annular rib portion which projects radially inwardly adjacent the other axial end thereof, said annular rib portion having an inner annular wall which is maintained in a press-fit engagement with an outer annular wall of said annular flange, said press-fit engagement as created by said annular rib portion being located so as to substantially include the centroid of the support ring, and the annular sleeve portion where it extends axially between said annular rib portion and said radial flange portion being free of press-fit engagement with said annular flange.

4. A mechanical seal according to claim 3, wherein said first and fourth radial surfaces are disposed in direct abutting and contacting engagement with one another, and wherein said gasket is axially compressed between said second and third radial surfaces.

5. A mechanical seal according to claim 3, wherein the annular radial flange portion of said retainer also radially overlaps and directly axially abuttingly contacts the free end of said annular flange.

6. A mechanical seal construction for creating a sealed relationship between a housing and a rotatable shaft which is surrounded by the housing, said seal construction comprising:

a pair of seal rings, one being connected for rotation with the shaft and the other being nonrotatable and connected to the housing, one of said seal rings being arranged for limited axial movement relative to the shaft, and means resiliently urging one of the seal rings axially toward the other of said seal rings;

said seal rings having annular radial seal faces opposing and contacting one another with one seal face rotating relative to the other;

one of said seal rings being formed of a relatively hard carbide material;

a support ring for supporting the carbide seal ring, the support ring having a cylindrical sleevelike portion loosely surrounding an outer cylindrical surface of said carbide seal ring and a radial portion which radially overlaps a part of said carbide seal ring which is disposed at an axial end of said carbide seal ring which is opposite from the seal face, said support ring being positioned in axially and radially spaced relation from the seal face of said carbide seal ring;

a high temperature resilient annular gasket positioned in an annular cavity defined radially between said carbide seal ring and said support ring to provide a resilient seal structure therebetween, said gasket being axially compressed between said radial portion and an opposed radial surface on said carbide seal ring, said gasket also being disposed radially between and radially sealingly engaged with said carbide seal ring and said support ring;

said carbide seal ring having a radial face on the axial end thereof on which said sealing face is defined, said radial face being disposed so as to face axially in the same direction as said sealing face but being positioned axially rearwardly from said sealing face; and a retaining ring having an annular radial wall portion which radially overlaps and axially abuttingly contacts the radial face on said carbide seal ring for retaining said carbide seal ring in said support ring and against said gasket, said retaining ring also including an axially-projecting annular flange which is fixed to the radially outer edge of said radial wall portion and which telescopically surrounds and has a fixed interference-fit engagement with the cylindrical sleeve portion for fixedly securing said retainer ring to said support ring, whereby said seal ring is loosely surrounded by and contained within the sleevelike portion of the support ring and is axially confined between said radial wall portion and said gasket to withstand pressure reversals on the seal ring without requiring use of a radial interference-fit engagement between said seal ring and said support ring.

7. A mechanical seal construction according to claim 6, wherein the annular flange of the retaining ring has an annular rib portion which projects radially inwardly adjacent a free end of said annular flange, said annular rib portion having an inner annular wall maintained in said interference-fit engagement with the cylindrical sleeve portion of the support ring at a location disposed substantially radially aligned with the gasket, and said annular flange where it extends axially between said annular rib portion and said radial wall portion being free of interference-fit engagement with said sleevelike portion.

* * * * *